W. H. BROCKMAN.
Churn-Dasher.

No. 223,879.        Patented Jan. 27, 1880.

WITNESSES
Villette Anderson
Phil. C. Masi.

INVENTOR
W. H. Brockman,
by E. W. Anderson,
his ATTORNEY

UNITED STATES PATENT OFFICE.

WILLIAM H. BROCKMAN, OF ANDERSON COURT-HOUSE, SOUTH CAROLINA ASSIGNOR TO HEWLETT K. SULLIVAN, OF SAME PLACE.

CHURN-DASHER.

SPECIFICATION forming part of Letters Patent No. 223,879, dated January 27, 1880.

Application filed December 15, 1879.

*To all whom it may concern:*

Be it known that I, WILLIAM H. BROCKMAN, of Anderson Court-House, in the county of Anderson and State of South Carolina, have invented a new and valuable Improvement in Churn-Dashers; and I do hereby declare that the following is a full, clear, and exact description of the construction and operation of the same, reference being had to the annexed drawings, making a part of this specification, and to the letters and figures of reference marked thereon.

Figure 1:
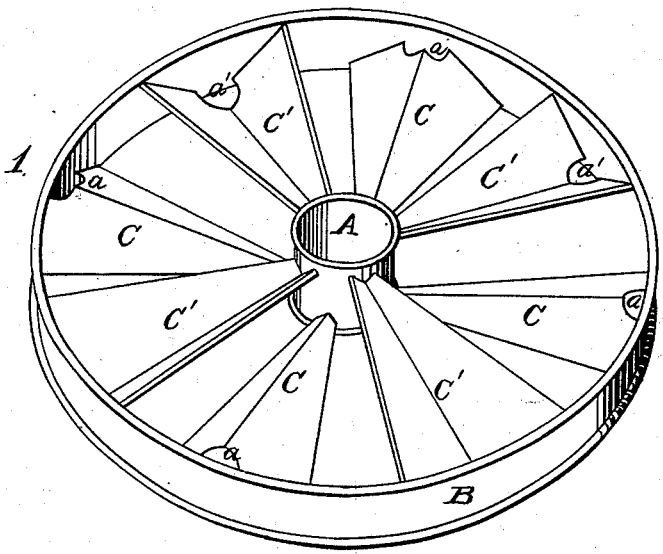
Figure 2:
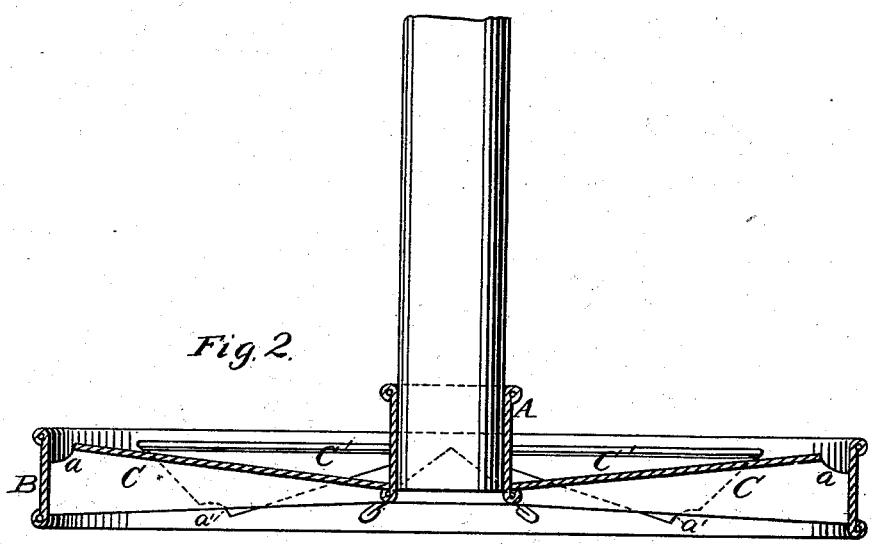

Figure 1 of the drawings is a representation of a perspective view of the dasher, and Fig. 2 is a vertical central section thereof.

This invention has relation to churn-dashers of that class having a series of radial angular beaters secured by an annular peripheral band and attached to a dasher-rod at their converging ends; and it has for its object to create a series of conflicting currents in the cream when the dasher is operated; and it consists in the construction and novel arrangement of a series of angular beaters radially arranged between the rod-socket and a peripheral band, and expanding outwardly, said beaters having their concave or channel faces alternately upward and downward and inclined toward as well as from the peripheral band, next to which they have escape-openings, as hereinafter shown and described.

In the accompanying drawings, the letter A designates the central socket for the dash-rod, consisting of a small ring or band of metal, tin being preferred. B indicates the peripheral band, and C C' the angular beaters or channel-pieces, connected at their smaller ends to the socket A, and expanding outward to the band B, to which they are also connected on the inside wall of the band.

The downwardly-turned beaters C are inclined outward and upward, and have at their outer ends, next the band, openings $a$. These beaters are designed in the churning operation to carry the air down into the milk, the openings allowing it to escape upward through the milk. On each side of each downwardly-turned beater is an upturned beater, C', also angular in form, and havings openings $a'$ next the peripheral band, but reversely inclined outward and downward toward said band. These beaters or channel-pieces serve, when the churning is done, to gather the particles of butter, the milk escaping through the openings $a'$.

The under side of each beater C', being angular and laterally slanting upward, throws the milk in two directions or currents as the dasher is forced down, thereby forming over each downwardly-turned beater meeting or conflicting currents, as indicated in the sectional view in the drawings. So, also, the downwardly-turned beaters C are angular on their upper sides, and when the dasher is raised produce conflicting currents under the dasher. In this manner the currents are caused to come together both in the ascent and descent of the dasher, and the butter is produced in a remarkably short time. The angular tapering pieces C C' are of similar pattern, and, being of small size, may be made out of scraps or refuse tin at a small expense; and the entire dasher may be readily made by any tinsmith.

What I claim, and desire to secure by Letters Patent, is—

The churn-dasher herein described, consisting of the angular beaters C C', radially arranged between the rod-socket A and a peripheral band, B, and extending outwardly, said beaters having their concave or channel faces alternately upward and downward and respectively inclined toward and from the peripheral band, next to which they are provided with escape-openings $a$ $a'$, as shown and described.

In testimony that I claim the above I have hereunto subscribed my name in the presence of two witnesses.

WILLIAM HOSEA BROCKMAN.

Witnesses:
J. A. DANIELS,
WM. L. BOLT.